United States Patent Office 2,788,333
Patented Apr. 9, 1957

2,788,333

PROCESS FOR THE MANUFACTURE OF UNICELLULAR PRODUCTS FROM POLYVINYL CHLORIDE AND BUTADIENE-ACRYLONITRILE

Jean L. Lewis, Chevy Chase, Md., and Charles F. Macy, Ambler, Pa., assignors to the United States of America as represented by the Secretary of the Army No Drawing. Application May 18, 1953,
Serial No. 355,890

8 Claims. (Cl. 260—2.5)

(Granted under Title 35, U. S. Code (1952), sec. 266)

The invention described herein, if patented, may be manufactured and used by or for the Government for governmental purposes, without the payment to us of any royalty thereon.

This invention relates to unicellular gas-expanded rubber-like synthetic material, and to a process for making the same. More particularly, the invention relates to the production of unicellular gas-expanded lightweight materials produced by mixing polyvinyl chloride with a not fully polymerized liquid copolymer of butadiene and of another unsaturated organic compound copolymerizable therewith, and gas-expanding the plastic mixture which also contains a blowing agent and a vulcanizing agent, by heating the same in a confined space and expanding the product and completing the cure by a subsequent heating.

Material produced in accordance with the present invention is particularly useful in the manufacture of cold weather insulation body clothing, footwear and handwear, but may also be employed for other uses to which unicellular natural and synthetic gas-expanded materials are usually put, such as life preservers, mats, shock-cushioning padding, mattresses, refrigerator insulation, etc. The material may be produced in the form of flat sheets or in any desired embossed or other configuration and shape.

Synthetic unicellular gas-expanded material presently in use for the Army experimental cold weather uniform, known as the "Coldbar uniform" is a vulcanized blend of plasticized polyvinyl chloride and butadiene-acrylonitrile copolymer; the blend is formed in the dry state by milling or high pressure mixing, followed by treatment in a mold at high temperatures and pressures; the product is then chilled and subsequently reheated at atmospheric pressure to produce the expanded material. This process yields a good product, but is slow, complex, and costly, and necessitates the use of special and expensive equipment.

We have found that a product equal or superior to that produced by the process just outlined may be obtained by mixing polyvinyl chloride with a liquid partial polymer of butadiene and acrylonitrile or other unsaturated organic compound copolymerizable with butadiene, incorporating a blowing agent and a vulcanizing agent, either before or after mixing the principal ingredients together, treating in a mold at high temperatures and pressures, cooling the product and moderately reheating it at atmospheric pressure. The desired general shape and surface pattern is imparted to the product during the first heating step by use of suitable molds. The addition of a controlled amount of plasticizer to the polyvinyl chloride enables the production of soft elastic, medium elastic and medium hard products; where a hard unicellular gas-expanded product is desired, the plasticizer may be greatly reduced in amount or even entirely omitted.

We have also found that by greatly exceeding the amount of elemental sulfur and/or other sulfur-containing vulcanizing agent in comparison with that customarily employed, we are able to produce a vulcanizable material of high strength and durability having the desired military (and civilian) performance characteristics.

Our process can be practiced without the use of expensive equipment, such as rubber mills and/or power blenders, and can be carried out by relatively inexperienced personnel. Control of the properties of the finished product can be easily and efficiently accomplished by proper proportioning of the ingredients of the mix, without having to vary the conditions under which the process is performed.

We shall now describe the practice of our invention in the form of a number of specific examples; it will be understood, of course, that these examples are by way of illustration and are not intended to limit the scope of our invention to the specific data set forth therein.

While the ensuing examples are in terms of a mix containing polyvinyl chloride, a plasticizer, and a liquid partial polymer of butadiene and acrylonitrile, it will be understood that other copolymers of butadiene and another unsaturated organic compound copolymerizable therewith are also contemplated, provided they are in the liquid partially polymerized state at the time of forming the mix. By "liquid partial polymer" we denote a polymerized product capable of further polymerization, which is still in the liquid state out of solution, but which upon further polymerization will turn into a solid, e. g. by crosslinking.

The liquid partial polymer preferred by us is a copolymer of butadiene and acrylonitrile, wherein the acrylonitrile constitutes about 15–50%; viscosity may be in the range of about 50–500 cp., as measured by a conventional viscosimeter for liquid substances, such as the Engler viscosimeter (see Hackh's Chemical Dictionary, third edition, 1946 printing, page 896). A more elastic end product results from a high percentage of butadiene in the butadiene acrylonitrile copolymer; however, butadiene is less compatible with polyvinyl chloride than is acrylonitrile. A ratio of 80% butadiene to 20% acrylonitrile in the liquid partial polymer is generally useful.

The employment of plasticizers permits further control of the properties of the final product. A wide choice among plasticizers is possible. Dioctyl phthalate is very suitable; dioctyl sebacate may be used therewith or in lieu thereof. Other plasticizing substances such as tricresyl phosphate, trioctyl phosphate, polychlorinated polyphenyls, chlorowax may be used for imparting flame resistance to the product. Inorganic materials such as antimony trioxide (not a plasticizer) may be added for increased flame resistance. Among the substances mentioned in this paragraph, the employment of dioctyl sebacate and trioctylphosphate were found to confer favorable low temperature performance characteristics on the product.

The gas-blowing agent for producing the desired unicellular (closed cell) structure may be a commercial chemical such as dinitroso pentamethylene tetramine (believed to be the active ingredient in Unicel ND, a product of E. I. du Pont de Nemours and Company). Also, diazoaminobenzene, p,p'oxybis (benzene sulfonylhydrazide), benzosulfohydrazide, or similar organic compounds which liberate nitrogen gas when heated, may be used.

For vulcanization, we employ such well known vulcanization agents and accelerators as elemental sulfur and compounds containing chemically bound sulfur such as benzothiazyl disulfide, tetramethyl thiuram disulfide, tetramethyl thiuram monosulfide or mercaptobenzothiazole.

Conventional color pigments can be added to the mix for imparting the desired shade to the finished product, e. g., olive drab in the case of the Army Coldbar uniform.

Example I

A plastic mix is prepared having the following ingredients:

100 parts polyvinyl chloride powder
80 parts dioctyl phthalate (plasticizer)
5 parts lead silicate
5 parts color pigments
100 parts liquid partial polymer of butadiene and acrylonitrile (a composition sold by B. F. Goodrich Company under the trade name Hycar 1012 x 41)
5 parts zinc oxide
3 parts stearic acid
5 parts vulcanization accelerator (e. g. a mixed thiuram acclerator sold by R. T. Vanderbilt under the trade name "Butyl 8")
7.5 parts sulfur
60 parts of a nitrogen-gas-evolving blowing agent (e. g. Unicel ND of E. I. Dupont de Nemours and Company, or Wingcel A of Goodyear Tire and Rubber Company)

The sequence in which these ingredients are mixed is not particularly important; for instance, the polyvinyl chloride is dispersed in the plasticizer, the liquid butadiene acrylonitrile copolymer is then added, and the remaining powdered ingredients are then dispersed in the mix. The resulting mixture, which has the physical consistency of a plastisol (a term employed in industrial usage for a paste dispersion of a synthetic plastic in a plasticizer together with filler, pigment and stabilizer) is then placed in a mold and subjected to the following heat cycle: 5 minutes at 250° F., 5 minutes at 300° F., 5 minutes at 350° F. The mold and its contents are then rapidly cooled to room temperature, and the mold is emptied after about 10–30 minutes measured from the commencement of the cooling operation. Expansion of the product and completion of the cure are accomplished by heating at atmospheric pressure for about 10–30 minutes at about 220 to 275° F.

The resulting product is a soft elastic unicellular sheet weighing about 3 to 4 pounds per cubic foot.

Example II

A mix is prepared having the following ingredients:

100 parts polyvinyl chloride
60 parts dioctyl phthalate
5 parts lead silicate
5 parts color pigments
140 parts liquid partial polymer of butadiene and acrylonitrile (see Example I)
7 parts zinc oxide
4.2 parts stearic acid
7 parts vulcanization accelerator (see Example I)
10.5 parts sulfur, and
45 parts of a nitrogen-gas-evolving blowing agent (see Example I)

This mix is compounded by adding the liquid butadiene acrylonitrile partial copolymer to the plasticizer, dispersing the polyvinyl chloride therein, then adding the other powdered ingredients. The resulting plastisol is then processed as in Example I, and the resulting product is a soft elastic unicellular sheet weighing about 5 to 7 pounds per cubic foot.

Example III

A medium hard elastic unicellular product, weighing 8 to 10 pounds per cubic foot is produced by following Example I, but modifying the ingredients of the mix by a reduction of the amount of the plasticizer to 60 parts, and blowing agent to 30 parts.

Example IV

A medium hard elastic unicellular product, weighing 8 to 10 pounds per cubic foot is produced by following Example II, but modifying the ingredients of the mix by a reduction of the amount of the plasticizer to 40 parts, and blowing agent to 30 parts.

Example V

A medium hard inelastic product, weighing 6 to 8 pounds per cubic foot is produced by following the procedure of Example I, but proportioning the ingredients of the mix as follows:

100 parts polyvinyl chloride
60 parts dioctyl phthalate (plasticizer)
5 parts lead silicate
5 parts color pigments
60 parts Hycar 1012 x 41
3 parts zinc oxide
1.8 parts stearic acid
3 parts vulcanization accelerator (Butyl 8)
4.5 parts sulfur
36 parts blowing agent (Wingcel A)

Example VI

A slightly heavier medium hard inelastic product weighing about 8–10 pounds per cubic foot is produced by following Example V, but by reducing the proportion of blowing agent in the mix to 24 parts by weight.

Example VII

A hard inelastic product, suitable, for instance, as an insulation block for refrigeration may be produced in accordance with Example VI, but omitting the plasticizer.

The ratios between polyvinyl chloride, plasticizer (e. g. dioctyl phthalate and dioctyl sebacate, or a mixture thereof), and butadiene copolymer, set forth in the foregoing examples may be further varied, as for instance by providing a mix in the proportions of 100 parts of polyvinyl chloride, 75 parts plasticizers and 30 parts Hycar, which will result in a medium hard inelastic product. Because of the inherently elastomeric properties of butadiene copolymers, an increase in the ratio of Hycar (or other butadiene copolymer) will tend towards the production of an elastic material. For practical purposes, we have found the ratio of 100 parts of polyvinyl chloride to from about 30 to about 150 parts by weight of butadiene acrylonitrile liquid partial polymer to be suitable for the purpose of our invention, although for special applications (e. g. for a very hard or very soft product) it is possible to operate below or above this range.

Surprisingly, we have found that a substantial increase in the amount of sulfur over that now recommended by industry in the production of gas expanded unicellular synthetic products is desirable to the point of necessity in order to obtain a cured product having the necessary strength enabling it to stand up under rough usage in military operations. While heretofore about 2 parts by weight of sulfur per 100 parts of butadiene acrylonitrile copolymer were considered to be the highest proportion of sulfur desired in practice, we have found that the employment of about 7.5–10 parts by weight of sulfur per 100 parts of butadiene acrylonitrile copolymer in our mix results in a product capable of passing the rigorous structural performance tests of Military Specification MIL-P–12420(QMC), Plastic, Expanded, Unicellular, Elastomeric.

Fungistatic ingredients may be incorporated in the mix in a manner well known to the art.

While the employment of organic solvents is not necessary in our process, it may be desirable at times to adjust the consistency of the mix by adding a low boiling solvent such as isopropyl alcohol, which boils off as a result of the heat treatment subsequently undergone by the mix.

From the foregoing description of our invention, it will be apparent to those skilled in the art that our process is capable of a variety of modifications and adaptations within the spirit of our invention and therefore within the scope thereof. We thus intend to define the scope

We claim:

1. A method of forming a unicellular gas-expanded rubber-like synthetic product, comprising forming an intimate plastic mixture of polyvinyl chloride, a liquid copolymer of butadiene and acrylonitrile capable of further polymerization to an elastomer, said liquid copolymer being present in an amount of from about 30 to about 150 parts by weight per 100 parts by weight of polyvinyl chloride, a blowing agent, and a sulfur-containing vulcanizing agent, and heating said plastic mixture to a temperature sufficiently elevated to effect expansion of said mixture and to complete vulcanization of said rubber-like product.

2. A method of forming a unicellular gas-expanded rubber-like synthetic product, comprising forming an intimate plastic mixture of polyvinyl chloride, a liquid copolymer of butadiene and acrylonitrile capable of further polymerization to an elastomer, said liquid copolymer being present in an amount of from about 30 to about 150 parts by weight per 100 parts by weight of polyvinyl chloride, a plasticizer, a blowing agent, and a sulfur-containing vulcanizing agent, and heating said plastic mixture to a temperature sufficiently elevated to effect expansion of said mixture and to complete vulcanization of said rubber-like product.

3. The method according to claim 2, wherein said plasticizer is dioctyl phthalate.

4. The method according to claim 2, wherein the temperature during the heating of said mixture is from about 250° to about 350° F.

5. The method according to claim 2, wherein said heating includes the steps of heating to about 250°–350° F., cooling and then moderately reheating said product to about 220°–275° F.

6. The method according to claim 2, wherein said sulfur-containing vulcanizing agent is present in said mixture in the ratio of at least about 7.5 parts by weight of said vulcanizing agent per 100 parts by weight of said butadiene acrylonitrile copolymer.

7. A composition for forming a unicellular gas-expanded rubber-like synthetic product, said composition being a plastisol at room temperature and comprising an intimate plastic mixture of polyvinyl chloride, a liquid copolymer of butadiene and acrylonitrile capable of further polymerization to an elastomer, said liquid copolymer being present in the ratio of about 30 to about 150 parts by weight per 100 parts by weight of polyvinyl chloride, a blowing agent, and a sulfur-containing vulcanizing agent.

8. A composition for forming a unicellular gas-expanded rubber-like synthetic product, said composition being a plastisol at room temperature and comprising an intimate plastic mixture of polyvinyl chloride, a liquid copolymer of butadiene and acrylonitrile capable of further polymerization to an elastomer, said liquid copolymer being present in the ratio of about 30 to about 150 parts by weight per 100 parts by weight of polyvinyl chloride, a plasticizer, a blowing agent, and a sulfur-containing vulcanizing agent, said vulcanizing agent being present in the ratio of at least about 7.5 parts by weight per 100 parts by weight of butadiene acrylonitrile copolymer.

References Cited in the file of this patent

UNITED STATES PATENTS

| | | |
|---|---|---|
| 2,299,593 | Roberts et al. | Oct. 20, 1942 |
| 2,386,995 | Wigal | Oct. 16, 1945 |
| 2,457,097 | Te Grotenhuis | Dec. 21, 1948 |
| 2,512,697 | Te Grotenhuis | June 27, 1950 |
| 2,570,182 | Daly et al. | Oct. 9, 1951 |

OTHER REFERENCES

Ind. and Eng. Chem., November 1939, volume 31, No. 11, page 1382.